INVENTORS
GEORGE C. REID
WAYNE E. BLACKBURN
DONALD A. HAMILTON
BY LESTER A. INNERS

Ronald Zibelli
ATTORNEY

INVENTORS
GEORGE C. REID
WAYNE E. BLACKBURN
DONALD A. HAMILTON
BY LESTER A. INNERS

Ronald Zibelli
ATTORNEY

Feb. 24, 1970  W. E. BLACKBURN ET AL  3,497,320
AUTOMATED CHEMICAL ANALYZER
Filed Dec. 15, 1966  5 Sheets-Sheet 5

INVENTORS
GEORGE C. REID
WAYNE E. BLACKBURN
DONALD A. HAMILTON
BY LESTER A. INNERS

Ronald Zibelli
ATTORNEY

United States Patent Office

3,497,320
Patented Feb. 24, 1970

3,497,320
AUTOMATED CHEMICAL ANALYZER
Wayne E. Blackburn, Burbank, Donald A. Hamilton, Pasadena, Lester A. Inners, La Verne, and George C. Reid, Glendora, Calif., assignors to Xerox Corporation, Rochester, N.Y., a corporation of New York
Filed Dec. 15, 1966, Ser. No. 602,018
Int. Cl. G01n 21/04, 31/00, 33/16
U.S. Cl. 23—230
115 Claims

ABSTRACT OF THE DISCLOSURE

Automated chemical analyzer having disposable testing containers of specific design passed therethrough. Sufficient reagents to conduct a single test are stored within the disposable testing container and are dispensed from their storage chambers to a reaction compartment as needed during the course of the analytical procedure. A wall or walls of each reaction compartment are sufficiently optically transparent so each compartment can be utilized as a cuvette for optical analysis. Additionally, the wall or walls of each compartment are sufficiently flexible so that external optical path-defining means can cooperate therewith to define a fixed optical path length through the solution in each compartment. A particularly useful disposable testing container has a plurality of reaction compartments, and associated reagent storage chambers, so that a comparison analysis can be conducted concomitantly with the primary test.

---

This invention relates to automatic chemical analysis and, more particularly, the invention relates to the automatic chemical analysis of body fluids, such as blood, urine, etc.

In the past, many routine, manual laboratory procedures have been conducted upon body fluids as an aid to the physician in determining, diagnosing, or preventing the various ailments which afflict mankind. As the science of medicine progresses and becomes more sophisticated in its analysis, new laboratory procedures and techniques are developed which analyze such fluids in search for a hidden clue which will establish or negate the existence of a particular affliction.

At the same time that medical science is developing new tests to aid in pinpointing particular afflictions, the population of the United States, and of the world, is expanding at an enormous rate. New phrases, such as "the population explosion," have been coined to express this physical phenomenon which is presently occurring and will continue to occur throughout the existence of mankind. Thus, with more tests being conducted per person and more people coming in need of such tests with each passing day, it becomes evident that more people must be trained and/or new devices must be developed to meet this on-rushing demand.

This problem has plagued mankind for many years and it is equally evident that the solution of training more qualified people to conduct this ever increasing amount of clinical analysis has not been equal to the task. Most clinical departments are headed by a resident pathologist or a licensed medical technologist who supervises a trained staff of laboratory technicians. As the majority of laboratory technicians are young, unmarried girls the turn-over rate is unusually high because of ensuing marriages which require the wife to devote her time to the needs of her family. The resulting manpower shortage places a limit both upon the quantity of clinical tests which can be conducted as well as the quality for, when one is burdened with an ever increasing amount of work which must be completed within a unit period of time, human errors are bound to become more prevalent.

To fulfill this ever increasing demand which is not being adequately met by our expanding technical labor supply, new devices have been developed to assist the laboratory technician in conducting a greater number of tests per unit time. Many of these devices took the approach of merely mechanizing, or automating, the purely manual operations of the ordinary clinical chemist or analyst. Exemplary devices of this type are shown by Hewson U.S. No. 2,560,107; de Seguim des Hons U.S. No. 3,143,393; Baruch in U.S. Nos. 3,193,358 and 3,193,-359; and Natelson U.S. No. 3,219,416. This approach results in a device having test tubes, funnels, reagent containers, pumps and other associated means for bringing a particular sample and the necessary reagents together to perform a desired analysis. Though the devices unquestionably perform more analyses per unit time the devices, as a whole, are subject to other objections which are similar to those stressed when a technician manually performs the analytical procedures. That is, the repetitious use of the same laboratory equipment for a plurality of distinct analyses poses the problem of contamination. To overcome this detrimental aspect a significant portion of the operating time of the devices must be allocated to the repetitious cleaning of the equipment to provide a clean environment for subsequent tests. As a result, the efficiency in terms of the number of tests which can be conducted per unit time is drastically diminished.

An additional detrimental feature of such devices, as well as other prior art devices, is the fact that they are initially programmed to perform a plurality of tests of a single type. That is, a plurality of samples are taken and a single test, for example, blood sugar, is run on each sample. The device must be reprogrammed to provide for additional tests on the remaining portions of the samples. In many instances, the devices cannot be so reprogrammed or to do so requires substantial modification or repositioning of the component parts by the operator. These modifications reduce the flexibility of the device and further diminish the improvement which can be obtained in performing purely manual procedures through mechanical means.

A recent automatic apparatus which has achieved some measure of success is the "Auto-analyzer" produced by the Technicon Instruments Corporation of Chauncey, N.Y. This apparatus is disclosed in the patents to Skeggs U.S. Nos. 2,797,149 and 2,879,141, as well as numerous other United States patents assigned to the Technicon Instruments Corporation. As disclosed in the aforementioned patents, a fluid sample to be analyzed is passed through tubular passages and a proportioning pump comprising a plurality of resilient flexible tubes, a platen, and a plurality of pressure rollers. The sample to be analyzed is passed through one or more processing fluids is passed through one side of a dialyzer while one or more secondary processing fluids are passed through the other side of the dialyzer thereby resulting in the separation from the sample of various constituents which pass through the dialyzer to the secondary processing fluids. Air is introduced into both flow streams before they reach the dialyzer to break up each stream into a plurality of liquid segments separated by air segments or bubbles. The air segments are stated to have the dual purpose of separating the samples from each other as well as providing a cleansing action between successive samples in order to prevent cross-contamination. The diffusate passing from the dialyzer is subjected to treatment to induce a color change in the liquid segments thereof indictive of the concentration of the constituent for which the sample is being analyzed. Normally, the air or other inert fluid which has been introduced into the fluid streams to segment the fluid material is then withdrawn from the stream at a point before colorimetric examination leaving a continuous liquid stream for final examination. Finally, the treated diffusate is directed to a flow cell of a colorimeter in which it is subjected to colormetric examination to provide a quantitative measurement of the constituent being analyzed.

Present commercial forms of the "Auto-analyzer" comprise a plural-channel apparatus which simultaneously performs a plurality of different tests on a single sample. Though there are approximately twenty different tests which can be conducted with the apparatus, it is not possible to program the analyzer to perform any number of tests less than the number of channels. Thus, when a physician requires only one or two tests to be conducted upon a particular sample, the unit cost per test is increased because the apparatus is non-selective and must do a profile analysis. Additionally, since a plurality of different samples having different concentrations of the constituent for which the sample is being analyzed are being passed through the flexible tubular passages, the flow cuvette, the dialyzer, etc., there is a problem of sample carryover or contamination which can have a significant effect on the reliability of the analytical data. To reduce contamination, cleansing fluids are generally provided in an attempt to assure a contamination free environment. This further encumbers an already complicated apparatus.

In operation, the proportioning pump passes the various fluids through a maze of flexible tubes. The repetitious flexing and continuous working of the tubes causes them to wear out very readily with the result that minute cracks can be found throughout. This results in areas which are more easily wetted by sample material passing therethrough thus adding to the contamination factor of the overall apparatus, as well as increasing the operational expense occasioned by the necessity of replacing worn tubing. Preceding each period of operation there is a required lengthy warmup period. Additionally, a calibration curve must be obtained each time the machine is started up to assist in compensating for various deviations which may occur during non-operating periods and, for proper analysis, a second calibration curve must be obtained at the end of each run to pinpoint deviations which occur during operation. Finally the preliminary analytical data obtained through use of this apparatus with respect to each particular sample must be correlated with the aforementioned calibration curves to provide the final analytical data in a form considered reliable by the physician. Such factors limit the total effect such an apparatus can have on clinical analysis as significant amounts of time must be spent by the technician in calibrating the apparatus and subsequently placing the analytical data so obtained in a reliable form.

It is therefore an object of the present invention to provide an automated analytical apparatus and system which is not subject to the aforementioned deficiencies.

It is an object of the present invention to provide an apparatus and system for the automatic chemical analysis of fluid materials and, in particular, body fluids such as blood and urine.

It is still a further object of the present invention to provide an apparatus and system for the automatic analysis of body fluids wherein a disposable container having a flexible reaction compartment is utilized.

A still further object of the present invention is to provide an automatic analyzer for testing body fluids which utilizes a disposable chemical testing package having a flexible reaction compartment and having at least one and, preferably, all the necessary reagents stored in said package.

A still further object of the present invention is to provide an automatic chemical analyzer system which is capable of simultaneously performing a plurality of different tests on a plurality of different samples.

A still further object of the present invention is to provide a disposable reaction container having a plurality of chambers for the storage of prepackaged reagents and at least one flexible optically transparent compartment which functions as a cuvette for optical analysis.

The above and still further objects, features, and advantages of the present invention will become apparent upon consideration of the following detailed disclosure of specific exemplary embodiments of the present invention.

The above and still further objects of the present invention are achieved by providing an automated chemical analytical system including a plurality of different disposable reaction containers, each different reaction container representing one prepackaged chemical testing unit, a magazine for the storage of said plurality of different reaction containers, the magazine being partitioned into a plurality of storage compartments with each of the different reaction containers being stored in a separate compartment with only like prepackaged reagent-storing containers, a station for the addition of sample to said reaction containers, said sample addition station including means to dilute a particular sample to the appropriate concentration, at least one reagent addition station, a mixing and incubation station wherein the reaction mixture is maintained in the disposable container for a period of time sufficient to culminate the chemical reaction, a detection station wherein the analytical data is obtained by monitoring one or more of the physical properties of the reaction mixture, a disposal station wherein the disposable reaction container is eliminated from the system, and means to transport said disposable reaction container from its storage area in said magazine through the system to said disposal station. The aforementioned disposable container has at least one flexible lower compartment for the admixing and reaction of reagents and sample, and an upper section having a plurality of reagent storage chambers in communication with each reaction compartment. At least one wall of the reaction compartment is optically transparent so that upon completion of the desired chemical reaction the compartment can be utilized as a cuvette for optical analysis. During analysis, a light source and a detection means are pressed against the flexible wall or walls defining the lower cuvette(s). The wall(s) yields a distance sufficient to define a fixed optical path between the light source and the detection means through the reaction mixture. For proper analysis, this distance should be constant for all units passing through the detection station.

The automated analytical system briefly described above, and which will be described in greater detail hereinafter, has many features which clearly show the significant advance the present invention represents over the prior art. Initially, by prepackaging the reagents in a disposable container the system is given utmost flexibility without sacrificing any speed which would normally be desired in an automated system. Flexibility is achieved by providing a plurality of different disposable containers within the system, each container representing a prepackaged chemical testing unit which can be selected at random and passed through the system according to a previously programmed procedure. That is, it is possible to select any number of different tests and run them simultaneously upon a plurality of different samples. Increased speed is achieved because the system is designed to perform many operations on different samples simultaneously. It need not be reprogrammed, portions of the machine need not be repositioned, incubation conditions need not be modified, reagent storage vessels need not be filled or replaced and there need not be a lengthy warm-up period prior to operation of the system. Since the reagents are stored within the disposable container, it is not necessary to provide complicated apparatus for the transportation of the reagents from their storage compartments to the reaction site. Once the reaction is complete and the disposable container has been passed through the optical read-out station, the unit passes from the system thus relieving technicians of the necessity of cleaning and/or repairing used equipment for subsequent testing. With these features in mind, it is believed that the significant improvement this invention represents over the prior art should be apparent.

The nature of the invention will be more easily understood when it is considered in conjunction with the accompanying drawings wherein.

Figure 2:
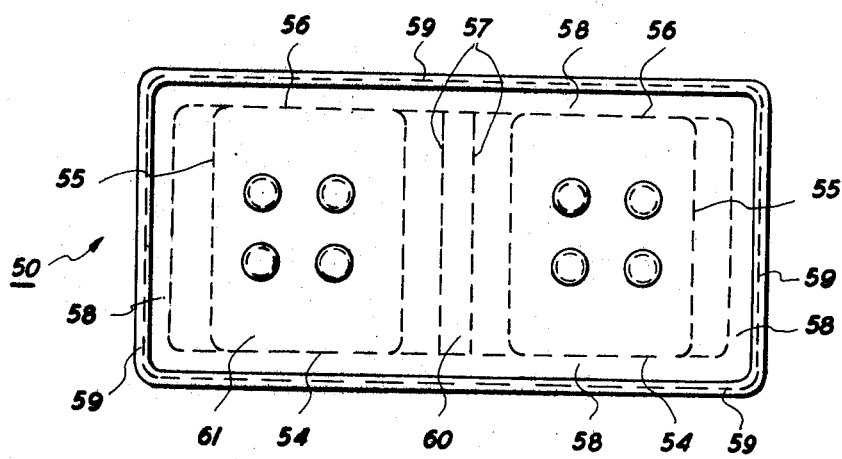
FIGURE 2 is a top view of the disposable container of FIGURE 1.
Figure 1:
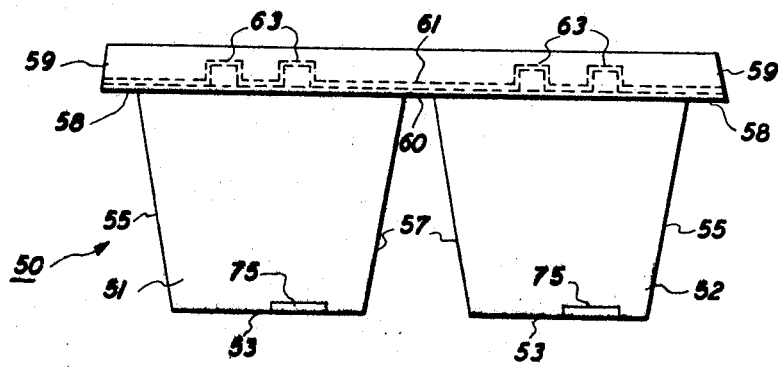
FIGURE 1 is an enlarged side view of an exemplary disposable container of the present invention.

Referring to FIGURES 1 and 2, there is seen a disposable container 50 having two separate lower compartments 51 and 52. Each lower compartment has a bottom wall 53, exterior side walls 54, 55, 56 and interior walls 57. As shown, walls 54 and 56 are vertically disposed while walls 55 and 57 diverge outwardly from bottom wall 53 toward the top of each respective compartment. Bottom walls 53 are in a shape of a rectangle with slightly rounded edges and corners (though the shape is not in any way critical). Since the walls 55 and 57 diverge slightly from bottom wall 53 toward the upper part of the compartments, the opening at the top of the compartment also defines a rectangle having the same width as the rectangle formed by bottom wall 53 but with a slightly longer length. The shape of the opening is not critical as long as it will not interfere with the introduction of sample and reagents into the lower compartment. The sloping walls 55 and 57 channel all materials downward toward the bottom of the unit. It is equally true that side walls 54 and 56 could be slanted inwardly from the opening down toward bottom walls 53 and thus aid in channeling material to the bottom of the compartment, however, it is preferred that they be parallel for optical reasons. The wall portions of compartments 51 and 52 terminate in a horizontal flange 58 which encircles the outer perimeter of the two compartments and holds them together as a distinct unit. Flange 58 terminates in an upwardly exending lip 59 which is folded inwardly to hold reagent storage section 61 in place on top of horizontal flange 58. Interior walls 57 extend slightly above the plane of horizontal flange 58 and are connected to each other at a point 60 thus defining a distinct barrier between compartments 51 and 52.

Figure 3:
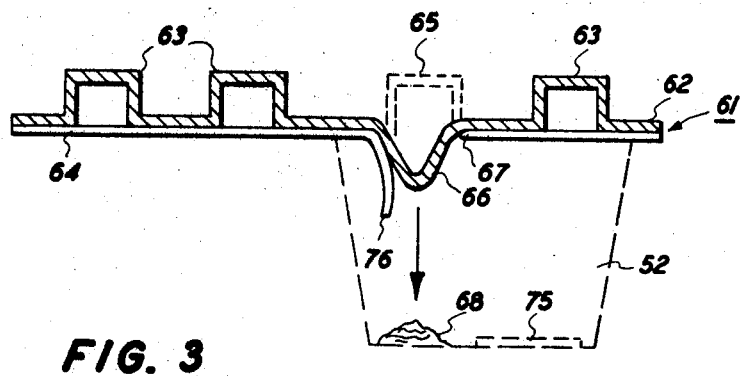
FIGURE 3 is an enlarged sectional view of the reagent-containing upper section of the disposable container of FIGURE 1, the right half of the figure showing the section after the contents of one reagent storage chamber has been emptied into the lower compartment.

Referring to FIGURE 3, there is shown reagent storage section 61 supported by flange 58 (not shown). Section 61 comprises an upper layer 62 defining a plurality of reagent storage chambers 63 in the form of "top-hats." On the underneath or open portion of layer 62 is a thin weak restraining layer 64 for holding the reagents in their respective chambers. Application of force at point 65 will eventually cause the shearing of restraining layer 64 at point 67 and the inversion of "top-hat" 66. Reagent or other material 68 will be emptied into lower compartment 52. In each lower compartment there is a magnetic stirring bar 75, for example a small cylindrical section of stainless steel wire. Should the magnetic material have a deleterious effect on the assay, then the stirring bar is entirely covered with a material which will not interfere in the analytical procedure, such as a complete coating of glass or plastic. With the reaction mixture in the lower compartment, the disposable container is moved to a mixing station where an external rotating magnetic field is applied, such as by a rotating magnetic bar. The rotation of the magnetic bar within the disposable container creates a vortex with the liquid material in the reaction compartment being substantially higher along the outside walls of the compartment than it is in the center. By regulating the rotational speed of the magnetic stirring bar it is possible to thoroughly mix all the reagents with the sample as well as to clean the walls of the reaction compartment and the lower extension of the upper section of the undissolved reagents. This ensures that all reagents are present in the reaction mixture in the proper amounts.

Figure 4:
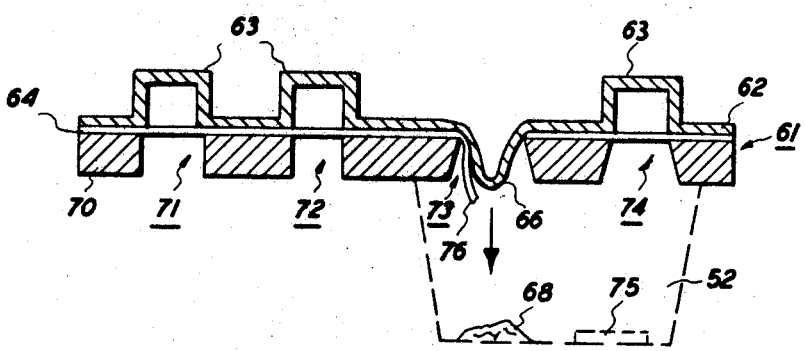
FIGURE 4 represents alternate embodiments for the structure of the upper section of FIGURE 3.

Alternate embodiments of structure 61 can be seen in FIGURE 4 wherein like numerals in this figure have been used to identify parts of the structure which are identical to those previous described with respect to FIGURES 1–3 (but not necessarily shown here in this figure). In this embodiment, there is laminated to the under portion of restraining layer 64 a further layer 70 which acts as a support member for the entire upper section 61. Layer 70 has a plurality of apertures 71, 72, 73, and 74 therein which lie directly beneath chambers 63. The apertures can be larger than the inside width or diameter of chambers 63, as in the case of aperture 71; the same size, as in the case of aperture 72; or it can be slanted as shown in apertures 73 and 74.

Section 61 is placed on horizontal flange 58 and barrier 60 and snugly held in place by overlapping lip 59. Additionally, heat seals or adhesive seals can be provided along flange 58 and barrier 60 to insure the retention of upper section 61 in its proper position. Heat sealing is particularly applicable with the upper section as shown in FIGURE 4 where layer 70 can be carefully selected to give exceptionally strong seals along the aforementioned points. Magnetic stirring bars 75 placed in each of the compartments 51 and 52 are utilized to thoroughly mix all the reagents and sample, as previously described. The vortex created by the magnetic mixing at an appropriate speed cleans the side walls of the reaction compartment, and around areas such as flap 76 and inverted "top-hat" 66. By properly controlling the rotational speed of the magnetic stirring bar the liquid reaction mixture can be made to enter these relatively inaccessible places and clean them of any trapped material.

Figure 5:
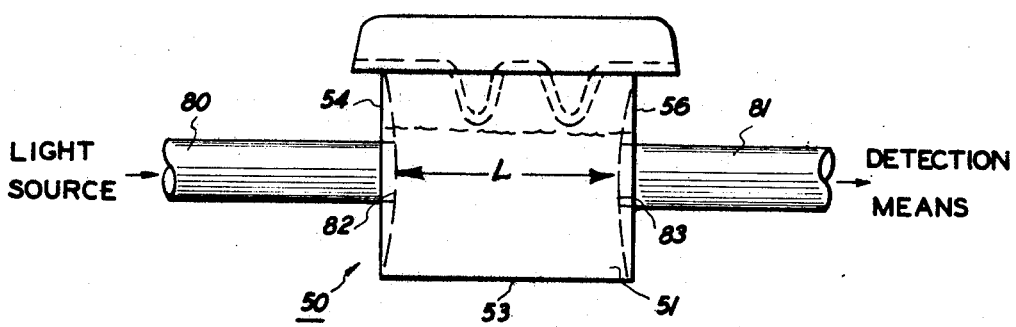
FIGURE 5 is an enlarged end view of the disposable container of FIGURE 1 during optical analysis.

In operation, container 50 is taken from a supply magazine and passed to a sample addition station where the proper amount of sample diluted with distilled water is aliquoted into compartment 51. This addition is accomplished by injecting the sample solution through a needle which has been passed through upper section 61. Preferably, one of the chambers 63 is left unfilled and the sample to be analyzed is injected into the inverted top-hat. Then, as with the reagent addition, the top-hat is inverted and the sample is deposited into the lower compartment 51. The sample-holding container is then passed to a reagent addition station where the application of a pushing force on each chamber 63 causes the reagent stored therein to be emptied into the appropriate compartments. Reagent addition can be done in one operation or it can be done sequentially, as is necessary to complete the analytical procedure. If done sequentially, the addition can be before, during or after incubation. In essence, reagents can be added any time prior to final detection as determined by the particular analytical procedure utilized. Container 50 is passed to a mixing station where it is maintained for a time sufficient to ensure the dissolution of all solid materials in the liquid contained in compartment 51. The container next passes to an incubation station where appropriate reaction conditions are imposed upon the materials within the container for a time sufficient to complete the desired reaction which is then measured at a detection station. It is not necessary that the mixing and incubation stations be separate and distinct as it is feasible to have one station wherein both results will be achieved. At a detection station, as shown in FIGURE 5, light conduits 80 and 81 are pressed against walls 54 and 56, respectively, of the lower compartment. Conduit 80 is connected at the opposite end to a light source (not shown) which can be filtered to provide light of a desired frequency or frequencies. Conduit 81, directly opposite conduit 80, is connected to an appropriate detection means (not shown) for monitoring the intensity of the light passed through the liquid mixture in the lower compartment. During the actual analysis, conduits 80 and 81 are moved toward each other whereby the flexible walls of the container 50 will deform and assume the position as shown by the dotted lines. In this manner, a fixed optical path L is defined between ends 82 and 83 of conduits 80 and 81, respectively. By providing a fixed optical path L in this manner, it is easier to mass produce the cuvette (i.e., the disposable container) because a certain critical feature, the optical path, has been eliminated as a strict production requirement. The optical path defining means is now built into the detection station and, as would be expected, significantly less detection stations should be produced than disposable containers. Since a fixed optical path is defined by the detection station and will be the same for each container passing therethrough, highly accurate and reliable data can be obtained with this system.

The disposable container of FIGURES 1-5 is used in conjunction with a double-beam detection mechanism. In one compartment there is provided, as disclosed above, a solution of the material being tested with all the reagents which will bring the reaction mixture to the desired point for analysis. The other compartment contains a solution of the material being tested in the absence of reagents. In certain instances, one or more reagents can be added to this latter solution, provided the reagents do not carry the reaction to completion or do not adversely affect, in any other way, the optical analysis. This latter solution is called a "critically incomplete blank" and will enable the analytical system to correct for the effects of the sample and the reagents added. The second compartment is compressed to define a fixed optical path in the same manner as described above with respect to the first compartment. To maintain the detection mechanism in calibration, standard solutions are passed through the detection mechanism at intervals so the latter can automatically adjust for deviations which occur during operation.

To dispense with the necessity of passing standard solutions through the detection mechanism at regular intervals a disposable container having three compartments, and the plurality of storage chambers associated with each compartment where reagents need be added, is provided for use with a triple-beam detection mechanism. The standard solution can be injected into the disposable container at any point in the system prior to optical analysis and will obviate the need for passing distinct standards through the system. The detection mechanism will analyze the standard and adjust for deviations from the known value. The analysis of the materials in the other two compartments is conducted in accordance with the disclosure of the preceding paragraph. If one wishes to conduct an extremely precise analysis and take into consideration every possible influencing factor, additional lower compartments can be built into the disposable container for the introduction of such factors and the analysis thereof. Thus, adjustments can be made which will compensate for the effect which these materials have upon the particular analysis. Additional means are associated with container 50 to identify the particular sample as to its source and as to the particular test being run thereon. For example, the container can have magnetic coding placed on the side thereof or a data punch tape attached thereto, the associated mechanisms for placement and read-out of such data are well known in the art. Means are also provided to correlate such information to establish an appropriate record for subsequent reference. Eventually, the container passes to a disposal station where is it withdrawn from the system and discarded.

Figure 6:
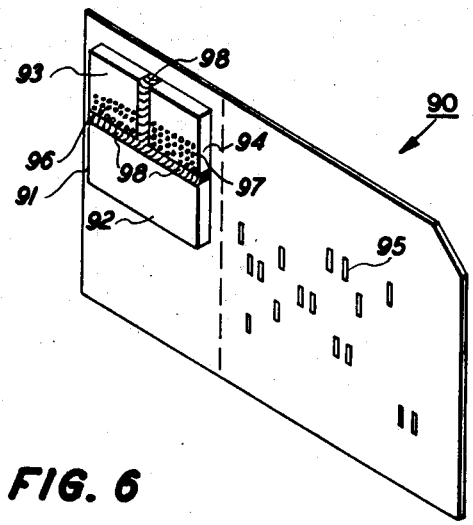
FIGURE 6 is a perspective view of a further exemplary disposable container of the present invention.

A further exemplary disposable container is seen in FIGURE 6 wherein a record data card 90 has on one surface thereof a flexible container 91 sectioned into a plurality of compartments 92, 93, and 94. Strong seals are provided along the outer periphery of the flexible container to securely bond the container to the underlying substrate. Such seals can be, for example, strong thermally bonded heat seals or strong adhesive seals. Under application of a moderate force, as will hereinafter be described, these bonds will not rupture with the result that the flexible container remains securely fastened to the record card. Separating compartments 92, 93, and 94 are "weak" seals 98 which under the application of heat, vacuum, flexing or pressure are opened thereby providing a single compartment haivng the powdered reagents loosely mixed in the bottom thereof as more fully described in connection with FIGS. 9 and 10. Such seals can be either heat seals or weak adhesive seals. Appropriate data 95 is stored on the remaining portion of the record card in a form well known to those skilled in the art and which will, in conjunction with the appropriate means in the automatic analyzer, cause the proper analysis to be conducted on the sample and to identity the sample and test results as being of a particular patient. Powdered reagents 96 and 97 are stored, respectively, in compartments 93 and 94. If necessary, it is possible to store additional reagents in lower compartment 92. The desired number of compartments is determined by the number of reagents required for a particular analysis and the compatibility of mixtures of reagents. A plurality of reagents can be stored in a single compartment provided they are compatible throughout a long shelf life.

In operation, one or more of the reagent storage chambers are manipulated to open the compartments and cause them to be in communication with lower compartment 92. The powdered reagent stored therein is deposited into the lower reaction compartment and the diluted sample solution is injected through a needle into this latter compartment. Mechanical members or fingers (not shown) can be provided to reinforce a particular weak seal so that upon application of force to the flexible container, that particular weak seal will not be broken. In this manner, selective compartments can be emptied of their contents sequentially thereby adding flexibility to procedures which can be utilized with this system. The unit is then passed through a mixing and incubation station where it is held for a time sufficient to culminate the desired chemical reaction and thereafter it is passed to an optical read-out station, for example similar to the one shown in FIGURE 5.

Figure 7:
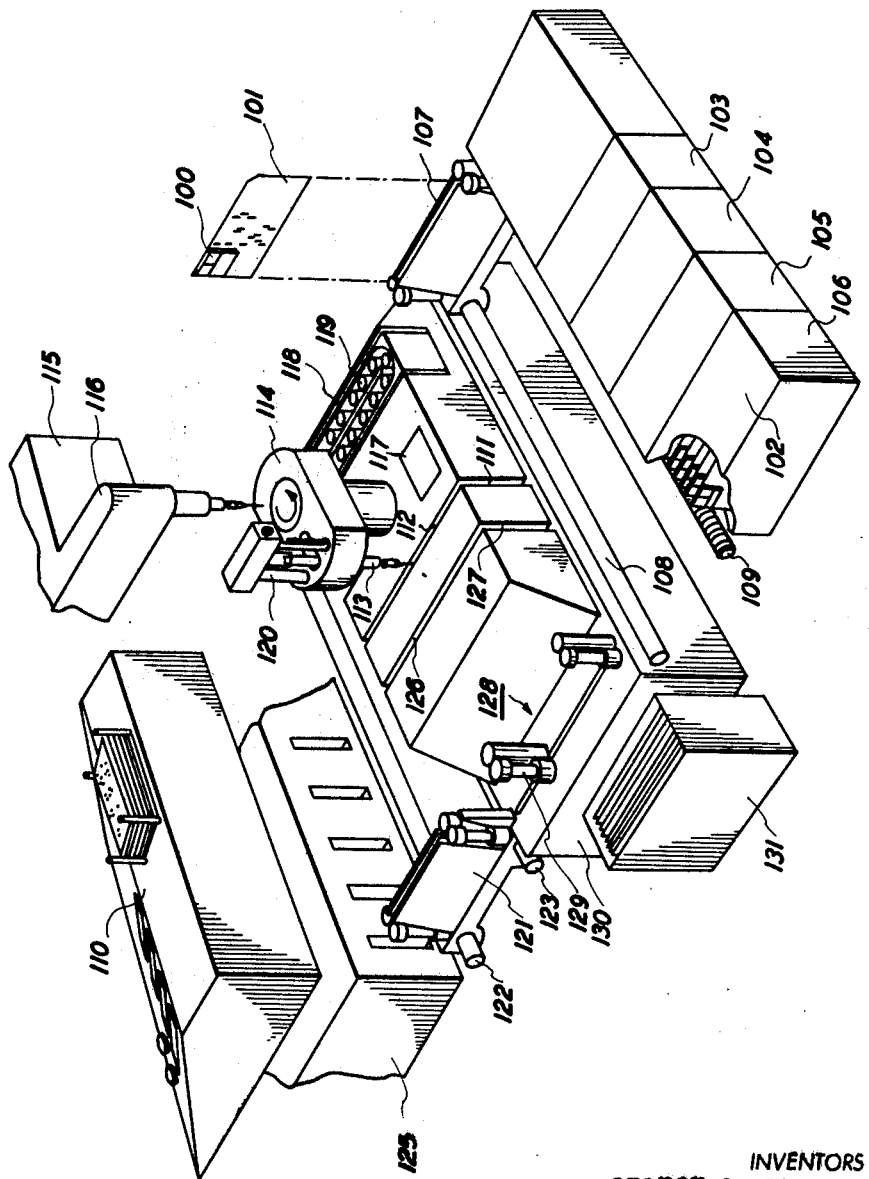
FIGURE 7 is a perspective view of an automatic analytical system utilizing the data card-type disposable container of FIGURE 6.

A fully automated analytical system using the flexible container of FIGURE 6 is shown in FIGURE 7 wherein a prepackage storage magazine 102 is partitioned into a plurality of compartments 103, 104, 105, 106, etc. As previously indicated, each flexible container 100 stored on data card 101 is a prepackaged chemical testing unit. Only like units are stored in the same compartment with other flexible containers. Transportation means in the form of a traversing card handler 107, reciprocating on runners 108 and 109, is positioned adjacent the opening of the magazine 102 for selecting, in response to a given input signal from control panel 110, the appropriate data card 101 for conducting a desired analysis. Appropriate samples are placed in the sample magazine 118 with each sample having its own separate identification. As shown, disposable syringe 113 is carried by revolving syringe head 114 which moves in a counterclockwise direction. An unused syringe first passes to diluent reservoir 117 where the proper amount of diluent, normally distilled water, is drawn up into the syringe. Turning counter-clockwise, the diluent carrying syringe passes to station 118 where a small amount of sample is drawn into the syringe proper from a sample vessel 119. Simultaneously, a machine-readable number on the sample vessel is read and transferred to control panel 110. Control panel 110 compares this number with other data which has previously been stored therein and commands the proper test to be conducted upon this sample. Traversing card handler 107 moves to a position adjacent the proper compartment in the prepackage storage magazine 102 and picks up a data card 101 having the appropriate container 100 for conducting the desired analysis. The traversing card handler then moves to a position adjacent the opening 111 in sample addition station 112. The data card is moved into sample addition station 112 where the disposable syringe 113, after revolving 180° on head 114 from station 118, is positioned above the flexible container on the card. Syringe 113 is lowered by gear means 120 until the needle penetrates flexible container 100 and the diluted sample has been deposited therein. The sample material is injected into the flexible container either prior to, during, or after the appropriate reagents have been emptied from their storage areas into the lower compartment. If desired, mechanical members or fingers can be provided in the sample addition station which can be programmed to sequentially empty the contents of the reagent compartments into the bottom portion of the flexible container. Optionally, this diluted sample can be injected into the flexible container and thereafter diluted with distilled water from a separate injection source (not shown). At this time, a blank reading may be made by the detection unit if desired. Unused syringes are stored in a syringe storing area 115 and are dropped by syringe dispenser 116 into open spaces in revolving syringe head 114 vacated by the disposal of used syringes. It is preferred that a disposable syringe be used for each sample material, thus, if a plurality of tests are to be conducted on a particular sample it will only be necessary to dispose of the syringe after the completion of the transfer of the plurality of aliquots. However, if the syringe is properly cleaned and steps are taken to prevent cross-contamination, each syringe can be used for as long as desired. Card 101 is then ejected from sample addition station 112 onto a second traversing card handler 121 reciprocating on runners 122 and 123. The traversing card handler deposits the card in the far-end entrance of incubation station 125. Prerecorded data on the data card determine when the card should leave the incubator and, consequently, the flexible container is held within the incubation station for a period of time sufficient to culminate the chemical reaction. At that point in time, the card is ejected from incubation station 125 and picked up by traversing card handler 121. For added flexibility, an additional traversing card handler (not shown) can be provided solely for the withdrawal of the data cards from the incubation station and the introduction thereof into the detection unit. If further reagents need to be added following the first incubation cycle, the data card is taken by traversing card handler to a reagent-addition station (which can be station 112 or a separate station) to receive additional reagents. The data card can then be placed back in incubation station 125 or sent directly to the detection station. Where the rate of a chemical reaction is the important datum to be obtained, such tests can be accommodated by periodically bringing the disposable container from the incubator to the detection station 126, recording the amount of energy absorbed photometrically, returning the container to the incubator, and thereafter repeating these steps until a sufficient number of readings have been taken. The data so obtained can be correlated and reduced to a curve which defines the rate at which the chemical reaction within the reaction compartment is proceeding. For certain reactions, this rate is proportional to the concentration of the constituent under analysis. From the traversing card handler 121 the data card is passed into slot 126 defining the detection station wherein one or more physical characteristics of the reaction mixture is monitored to obtain the desired analytical data. Within the detection station the analytical data obtained is immediately transferred to the data card to provide a complete record for future reference. After detection, the card is ejected from the detection station 126 at opening 127 and picked up by traversing card handler. Once again, for added flexibility, a traversing card handler for solely picking up ejected cards from the detection zone can be provided. The data card is then taken to disposal station 128 where a card slicer 129 removes that portion of the card supporting the flexible container. The flexible container supporting portion of the card falls into a disposal cavity 130 while the data containing portion of the card is dropped into storage container 131. As shown, storage container 131 is not integrated with control until 110 but it can be easily positioned to be an element thereof. If so positioned, the cards can be automatically read and data stored in an appropriate memory device for subsequent reference. In the device as described, the cards are taken by a technician and transferred to the control unit where the information contained on the data card is stored until such time as required by the physician.

After the first card for a given analysis has been deposited in the sample addition station 112, the traversing card handler 107 will immediately move to the proper compartment adjacent the magazine to receive a second card, and the entire process will be repeated for that particular analysis. It should be appreciated that there will be many cards at various locations within the system simultaneously. By simultaneously, it is not meant that the beginning and end of each analysis coincides with the beginning and end of other analyses but rather that there is a substantial overlapping of the operational steps involved. Thus, one card will be in the sample addition station while another will be in the detection station. Obviously, the analysis of the sample in the card in the detection station will be completed long before the completion of the sample now being deposited. However, since there is an overlapping of operational steps, such tests are considered to be simultaneous within the meaning of the word as used in this application.

Figure 8:
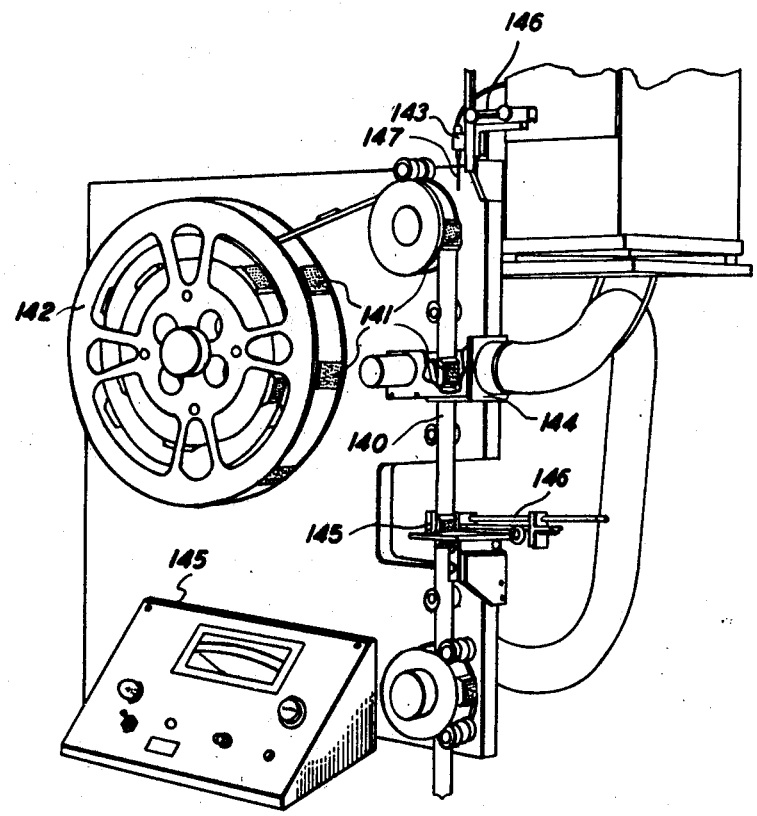
FIGURE 8 is a perspective view of still a further automatic analytical system as contemplated by the present invention wherein the disposable containers are carried by an elongated tape.

Referring to FIGURE 8, there is seen an alternate embodiment of the present invention wherein the supporting substrate for the flexible container comprises an elongated tape 140 having a plurality of flexible containers 141 stored thereon. The container-supporting tape is wound upon a storage reel 142 and threaded through a sample addition station 143, a mixing and incubation station 144, an optical read-out station 145 and thereafter finally deposited in a disposal station (not shown) or wound upon a take-up reel (also not shown). Tape 140 has appropriate sprockets therein, much like movie film, so it can be indexed from position to position. The supporting tape can have a magnetic coding along an edge or other means of printing in binary languages. Sensors mounted near the edge of the tape can read the recorded data and command various portions of the system to perform desired operations on the flexible container. Data such as patient identification numbers and analytical results can be recorded on the tape for storage and subsequent read-out. Ratchet and pawl mechanisms 146 are provided to move diluted sample injector 147 and detection means into and out of position. As is apparent this device does not have the flexibility of more fully automated systems such as the one shown in FIGURE 7. Each particular sample must wait its turn for analysis and only one type of test or a fixed series of tests is normally programmed into a single reel (including the overall apparatus). However, for more flexible multiple testing a bank of reels is provided with each reel having a different testing prepackage so that a plurality of different tests are performed simultaneously (1) on aliquoted portions of the same sample or (2) on different injected samples. In this case the reels are mounted adjacent each other and the sample injector traverses back and forth across the reels.

Figure 9:
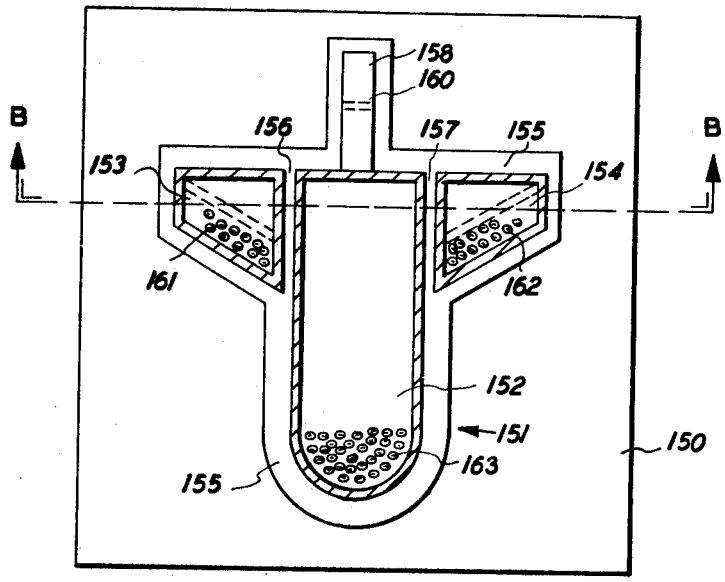
FIGURE 9 is a sectional view of a further exemplary disposable container taken along section line AA of FIGURE 10.
Figure 10:
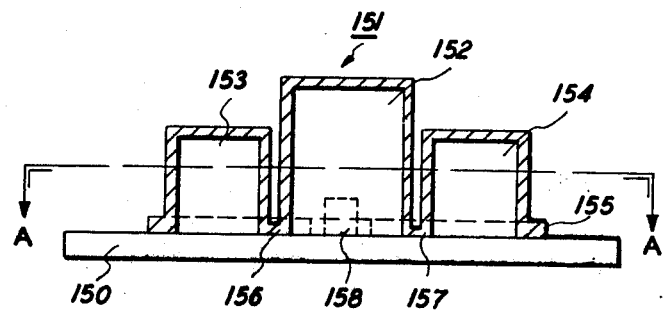
FIGURE 10 is a sectional view of the disposable container of FIGURE 9 taken along section line BB of FIGURE 9.

A further exemplary disposable container is shown in FIGURES 9 and 10 wherein a support member 150 has on one surface thereof a flexible container 151 sectioned into a reaction compartment 152 and a plurality of reagent storage chambers 153 and 154. A strong seal 155 is provided along the outer periphery of the unit to securely bond the container to the underlying substrate. Separating compartment 152 and chamber 153, and compartment 152 and chamber 154 are weak seals 156 and 157, respectively, which under the application of heat, vacuum, flexing or pressure can be opened, thereby providing a single compartment having the powdered reagents loosely mixed in the bottom thereof. Channel 158 is provided for the introduction of diluted sample material into compartment 152. After sample addition care should be taken during the mixing operation to ensure that a portion of the reaction mixture contained in compartment 152 is not accidentally discharged from that compartment. This can be achieved, for example, by heat sealing a portion of the channel 158 to the underlying substrate 150 (as shown by dotted lines 160) or by merely holding the channel closed mechanically. Powdered reagents 161 and 162 are stored, respectively, in chambers 153 and 154. As shown, additional reagents 163 can be stored in the main compartment 152.

If additional reagent storage chambers are required to store all the reagents, the further chambers can be provided which can be made to be in communication with compartment 152. Referring to FIGURE 9, each chamber 153 and 154 is partitioned along the dotted lines shown therein into two separate storage areas. The dotted line separating the two storage areas can represent a strong seal if the reagents are to be emptied first into the main compartment 152 or, alternatively, it can be a weak seal if the reagents maintained in the different areas of the same chamber are to be mixed together prior to addition to the main compartment. In this latter event, the weak seal 156 should be strengthened by exterior forces, such as by metallic fingers or rollers, while the weak seal along the dotted line is broken and the materials in the respective storage areas mechanically mixed. Then, seal 156 is broken and the mixed reagents emptied into compartment 152. As previously noted, it is possible to sequentially add reagents from the various storage chambers at specified times during the analytical procedure. If necessary, a diluent can be added to any of the storage chambers 153 or 154 prior to the time when the reagent is emptied into compartment 152, to dissolve the reagent stored therein. The disposable container described in this figure can be bonded to a data card and, for example, passed through a system as shown in FIGURE 7, or made part of an analytical tape and used in a system as shown in FIGURE 8.

As previously indicated, the weak seals separating the storage chamber from the cuvette compartment can be broken by heat, vacuum, flexing or pressure. When using heat, the seal must buckle away from the layer to which it is bonded. A further heat technique is where a fusible material, for example paraffin, has been used as an adhesive to bond the two layers together. Under the application of heat, the adhesive properties of the fusible material are destroyed and the layers are separated. When using a vacuum technique, the unit is placed in a mold and sufficient vacuum is drawn on the unit to lift the upper layer from the supporting layer thereby breaking the weak seal and placing the chamber in communication with the reaction compartment. The weak seals can further be broken by mechanically manipulating them until they break. Additionally, knobs or levers, etc., can be provided which can be grabbed by mechanical elements and moved, pulled, or manipulated to break the weak seals. In each of these techniques, this destruction of the weak seals can be done at different times in order to sequentially empty the contents of the reagent chambers into the reaction compartment. This further adds great flexibility to the analytical procedures which can be formed with the systems disclosed herein.

Since it is expected that the disposable containers will be stored for long periods of time with the prepackaged reagents therein, the materials which make up the disposable container are selected so as not to contaminate or assist in the degeneration of the prepackaged chemicals. It is preferred that the construction materials be chemically inert or, at least, chemically inert to the reagents and any other possible chemicals which might, in a clinical environment, come in contact with the container. Once the reagents are prepackaged, the outer layer of the storage compartment will act as a barrier material preventing passage of contaminating factors. Alternatively, a plurality of disposable containers which do not have especially good long term barrier properties can be packaged together within a barrier material which will preserve the initial properties of the prepackaged reagents. Suitable materials include the fluorocarbons, such as trifluoromonochloroethylene, polytetrafluoroethylene, and Fluorothene (a product of Union Carbide Corporation); and polyolefins, such as polyethylene, Ionomer (a cross-linked polyethylene based polymer produced by Du Pont Corporation), and polypropylene; polystyrenes; polyvinyl chloride; polyethylene terephthalate, and polycarbonates. During use, the reaction mixture will be in the cuvette compartment for a relatively short period of time in comparison to the overall storage life of the prepackage unit; therefore, it is not necessary to provide the same stringent requirements for the material comprising the cuvette compartment as those set forth for the reagent storage section. The cuvette material is preferably inert to the reaction mixture under the ambient conditions which exist during the analysis. The material should also be non-porous thereby preventing the seepage of portions of the reaction mixture from the compartment. Optically, the materials should transmit a substantial portion of the light incident thereupon. It is preferred that the material be clear through a material with uniform haze may also be employed. The walls of the cuvette are flexible and yield under application of force in the detection station to define a fixed optical path between the light source and the detection means. With the cuvette being flexible, it is possible to eliminate production requirements as to the exact width or diameter of the cuvette; that is the requirements need not be as strictly complied with as when a rigid cuvette is being produced. The quality control, in the case of the flexible cuvette, being built into the detection station rather than the cuvette proper. Suitable materials include plasticized polyvinylchloride, Ionomer (a cross-linked polyethylene based polymer), cellulose acetate, cellulose propionate, and cellulose butyrate. It is not always possible to provide a material having all the properties necessary for storage as well as having good optical properties for the cuvette. Accordingly, the reagents can be stored in a section constructed of one material and the cuvette made out of a different material. The two sections are then united, in any suitable manner, to provide the prepackaged unit. It should also be noted that two or more layers may be laminated together to provide a storage chamber having the desired barrier qualities. An exemplary description of the materials utilized in the preparation of a disposable container as described in FIGURES 1–5 include polyolefins for the reagent-storing section and the restraining layer holding the reagents in the top-hat chambers, and cellulose propionate as the cuvette. The restraining layer, as noted above, can be made from the same material used in producing the reagent storage sections. To achieve proper shearing the layer should be approximately an order of magnitude thinner than the storage layer.

The manner of producing the disposable containers of the present invention is not considered part of this invention. In general, however, any suitable method can be used which will produce a container having the desirable characteristics. Thermoforming operations, such as pressure forming or vacuum forming, can be used to produce portions of the disposable container which have intricate designs. Pressure forming, however, is preferred because it is possible by using high pressure air to get the plastic material into areas where it cannot be drawn by a vacuum. Thermoforming operations are especially useful in producing the flexible portion of the containers where the walls are relatively thin.

The reagents stored within the chambers in the disposable container can be either in solid or liquid form. Liquid storage is not as desirable, however, because there is a greater propensity towards chemical reaction, either with the storage wall or with material permeating therethrough. Additionally, liquid materials are generally known to be more sensitive to light and other portions of the electromagnetic spectrum and, therefore, degrade faster unless adequate filters are provided to eliminate deleterious radiation. Accordingly, it is preferred to store the reagents in solid form whenever possible. When stored in the solid state, the reagents can be in powdered or tableted form, either singly or in combination with other compatible reagents. A disadvantage of storing two or more powdered reagents together is the extreme amount of surface area available for chemical reaction. Even though the materials are relatively non-reactive, prolonged storage under such conditions may have a deleterious effect on the reagent mixture. In such cases it would be best to package the materials separately or to package them in tablet form. Tableting sufficiently reduces the contact surface area between reagents as only point contact, in essence, is achieved when one spheroidal (or substantially spheroidal) tablet is placed on top of another. The actual form of the tablet is not critical but selection of a proper shape (for example to give minimum contact) may prove advantageous in increasing the storage life of the prepackaged reagents. Additionally, by providing detents in the storage chamber and snapping the tablets into place a plurality of tablets can be placed in the same chamber but spaced from each other to eliminate contact for possible chemical reaction. In this approach, if sufficiently strong detents are provided the restraining layer of FIGURES 1–5 or the weak seals of FIGURE 6 can be omitted in analytical procedures wherein all reagent tablets are dropped into the reaction compartment before mixing or it is not disadvantageous to have the reaction mixture splash upon a tablet which has not been dropped into the mixture. Tableting provides a feasible method for accurately depositing the proper amount of chemical reagent within a particular chamber. Severe dust and contamination problems may exist when a plurality of different powdered chemicals are being deposited into storage chambers which are a fraction of an inch apart. When tableting form of reagent addition is utilized these problems are, at least, eliminated from the packaged line and placed in their own environment where they can be dealt with separately. It is, of course, necessary to use only those materials in the tableting process which will not have a deleterious affect on the analytical procedure. In any case, the reagents, whether stored in liquid or dry form, must be put into the reagent chambers in a measured amount, the tolerance of which is determined by the given analytical procedure. Finally storage of the reagents, whether they are in powdered, tableted or liquid form, may be in a dry inert gas atmosphere, such as nitrogen. By providing an inert atmosphere, the relative chemical activity of the reagents are significantly reduced thereby increasing the shelf life of the prepackaged unit.

While the invention has been described with reference to preferred embodiments thereof, it will be understood by those skilled in the art that various changes in form and details may be made without departing from the true spirit and scope of the invention. Many alternate container designs can be conceived which will achieve the advantageous results herein disclosed. While one embodiment has been shown for securing the upper section of FIGURES 1–5 to the lower section, many other ways of achieving this result can be utilized. For example, the upper section can be heat sealed to the lower section or the sections can be crimped together to provide a unitary structure.

Further, it is contemplated that any analytical procedure can be adapted to the herein disclosed invention. While the apparatus and system herein disclosed is particularly suitable for routine blood chemistry, such as glucose, blood urea nitrogen, albumin, bilirubin, total protein, etc., numerous other analytical tests which are run periodically in any chemical environment can be automatically performed in accordance with the aforesaid disclosure.

Accordingly, all substitutions, additions, and modifications to which the present invention is readily susceptible, without departing from the spirit and scope of this disclosure, are considered part of the present invention.

What is claimed is:

1. A disposable reaction container comprising a lower section having a plurality of separate compartments for the admixing of materials added thereto, at least a portion of the walls defining the plurality of separate compartments being sufficiently optically transparent so that each of said compartments can be utilized as a cuvette for optical analysis, said walls being sufficiently flexible so that external optical path-defining means can cooperate therewith to define a fixed optical path length through the reaction mixture in each compartment, a section for the storage of prepackaged reagents, said storage section having at least one separate reagent storage chamber adjacent each of said plurality of admixing compartments, and restraining means to prevent the premature movement of prepackaged reagents from each of said reagent storage chambers.

2. The disposable reaction container of claim 1 wherein each of said admixing compartments has at least one set of opposite walls which are vertically disposed.

3. The disposable container of claim 1 wherein the restraining means comprises a shearable layer disposed adjacent the openings of said plurality of reagent storage chambers, said restraining layer being sufficiently strong so that it will shear only below a particular reagent storage chamber when application of force is made thereto from within said storage chamber.

4. The disposable container of claim 1 further including an apertured support member disposed on the opposite side of said restraining means from the openings of said plurality of reagent storage chambers, the apertures in said support member being aligned with the openings of said plurality of reagent storage chambers.

5. The automated analytical system of claim 108 further including a station for the storage of a plurality of different disposable reaction containers, each different reaction container representing one prepackaged chemical testing unit, and said section being partitioned into a plurality of compartments with each of the different reaction containers being stored in a separate compartment with only like prepackaged reagent-storing containers.

6. The automated analytical system of claim 108 further including a mixing and incubation station wherein the reaction mixture is maintained within the admixing compartment of the disposable container for a period of time sufficient to bring the reaction mixture to the desired state for analysis.

7. The automated analytical system of claim 108 further including a station for the dilution of a sample to be analyzed to the appropriate concentration.

8. The automated analytical system of claim 78 having a plurality of reagent addition stations.

9. The automated analytical system of claim 108 including a detection station associated with said sample addition station.

10. The automated analytical system of claim 108 further including a detection station associated with a reagent addition station.

11. The disposable reaction container of claim 1 wherein said upper section is heat sealed to the flange of said lower section.

12. The disposable reaction container of claim 1 having data stored thereon.

13. The disposable reaction container of claim 1 wherein said wall or walls are sufficiently flexible so that they will yield when pressed against by light source means and detection means in a detection station to thereby define a fixed optical path length between said light source means and said detection means through the reaction mixture in each compartment.

14. The disposable reaction container of claim 1 wherein said disposable container comprises material or materials which do not adversely affect to an unacceptable degree each analysis being conducted therein.

15. The disposable reaction container of claim 1 wherein there are a plurality of separate reagent storage chambers adjacent each of said plurality of admixing compartments.

16. An automated analytical system including the disposable reaction container of claim 15, a station for the addition of a sample aliquot from a sample storage site to at least one of said reaction compartments, at least one station for the addition of at least one reagent stored within said disposable container to at least said sample-containing reaction compartment, a detection station for monitoring at least one of the physical properties of each reaction mixture within each reaction compartment and deriving a final analytical result based upon the information obtained therefrom, said detection station including optical path-defining means adapted to cooperate with the flexible wall or walls of each reaction compartment to define a fixed optical path length through the reaction mixture therein, and means to transport said disposable reaction container through each of said stations to said detection station.

17. The automated analytical system of claim 16 wherein the additions to each of said reaction compartments are such that a difference in absorbance results and said detection station includes means for measuring the absorbance of the reaction mixture within each reaction compartment and means to derive a final analytical result based upon the measured absorbance differences.

18. The automated analytical system of claim 16 further including a second station for the addition of at least one further reagent stored within the disposable container to at least one of said reaction compartments.

19. The automated analytical system of claim 16 wherein said detection station includes light source means and means responsive to the magnitude of light absorbed by the reaction mixture in each reaction compartment as light is transmitted through each reaction compartment from said light source means, and means to compress said disposable container between said light source means and said responsive means during analysis to define said fixed optical path length through each reaction mixture.

20. The disposable reaction container of claim 1 wherein the optically transparent portion of each admixing compartment are those substantially vertical walls parallel to the longitudinal axis of the disposable container.

21. The disposable reaction container of claim 1 wherein said restraining means comprises a thin plastic layer positioned between said reagent storage section and said admixing compartments, said reagent storage section, said restraining layer and said admixing compartment section being bonded together.

22. The disposable reaction container of claim 1 further including a flange surrounding the upper perimeter of said separate admixing compartments adjacent ones of said separate admixing compartments being separated by a portion of said flange which acts as a barrier to prevent the admixing of materials added to adjacent compartments.

23. A disposable chemical testing unit comprising a supporting carrier, a plurality of reaction containers securely bonded to one surface of said supporting carrier, said carrier and each of said containers defining a reaction compartment and at least one reagent storage compartment associated with each reaction compartment, each reaction compartment and the reagent storage compartments associated therewith being separated from each other by walls weakly bonded to said supporting carrier so that said compartments can be brought into communication upon destruction of the weak bonds, the wall or walls of each reaction compartment being sufficiently optically transparent so that each reaction compartment can be utilized as a cuvette for optical analysis, and said wall or walls being sufficiently flexible so that external optical path-defining means can cooperate therewith to define a fixed optical path length through the reaction mixture in each reaction compartment.

24. The disposable testing unit of claim 23 wherein said wall or walls are sufficiently flexible so that they will yield when pressed against by light source means and detection means in a detection station to thereby define a fixed optical path length between said light source means and said detection means through the reaction mixture in the reaction compartment.

25. The disposable testing unit of claim 23 wherein said disposable unit comprises material or materials which do not adversely affect to an unacceptable degree the analysis being conducted therein.

26. The disposable testing unit of claim 23 wherein appropriate data is stored on said supporting carrier for instructing an associated analytical apparatus to perform a desired chemical analysis on each of said reaction compartments comprising said disposable testing unit.

27. The disposable testing unit of claim 23 wherein the supporting carrier is an elongated tape having said plurality of reaction containers supported thereon.

28. The disposable testing unit of claim 27 wherein said elongated tape is optically transparent so that a beam of light can be passed through said tape, the wall of said reaction compartment substantially parallel to said tape, and the reaction mixture within said reaction compartment between said wall and said tape.

29. An automated analytical apparatus comprising means to carry a plurality of reagent-storing disposable chemical testing containers; means to transfer at least a portion of a sample from a sample storage site to a reaction compartment within one of the plurality of disposable containers; at least one means for the addition of at least one reagent stored within the disposable container to the reaction compartment; means further along the path of travel of said carrying means to monitor at least one of the physical properties of the reaction mixture within the disposable container; said monitoring means including light source means and means responsive to the magnitude of light absorbed by the reaction mixture as light is transmitted therethrough from said light source means, said monitoring means further including means to compress said disposable container between said light source means and said responsive means during analysis to define a fixed optical path through the reaction mixture; and means to advance said carrying means through said sample and reagent addition means to said monitoring means.

30. The automated analytical apparatus of claim 29 further including means to incubate the reaction mixture within the reaction compartment of the disposable container for a period of time sufficient to bring the reaction mixture to the desired state for analysis.

31. The automated analytical apparatus of claim 29 further including means to dilute a particular sample to the appropriate concentration.

32. The automated analytical apparatus of claim 29 wherein said means to transfer sample portions includes means to dilute the sample portion to the appropriate concentration.

33. The automated analytical apparatus of claim 29 wherein said reagent addition means includes means to place the reagent-storing chambers of the disposable container in communication with the reaction compartment.

34. The automated analytical apparatus of claim 29 further including additional reagent addition means further along the path of travel of said carrying means.

35. The automated analytical apparatus of claim 29 wherein there are a plurality of monitoring means.

36. The automated analytical apparatus of claim 29 further including means to eject a used disposable container from said carrying means into a disposal zone after the disposable container has passed through the monitoring means for the last time.

37. The automated analytical apparatus of claim 29 further including additional monitoring means associated with said apparatus in said sample transfer means.

38. The automated analytical apparatus of claim 29 further including additional monitoring means associated with said apparatus in said reagent addition means.

39. The automated analytical apparatus of claim 29 wherein said monitoring means further includes means to split a single light beam into a plurality of beams and a plurality of light conduits for conducting the plurality of light beams from said light source through different reaction mixtures in different reaction compartments of a single disposable container to a second plurality of light conduits for conducting the plurality of light beams to said responsive means.

40. The automated analytical apparatus of claim 29 further including means to identify a particular disposable container as being from a particular patient and to correlate the analytical data obtained by said monitoring means with the patient identification data.

41. The automated analytical apparatus of claim 29 further including means to recycle an analyzed disposable container from said monitoring means back to said incubation means for further incubation prior to additional analysis.

42. The automated analytical apparatus of claim 29 further including at least one additional means for the addition of a least one reagent stored within the disposable container to the reaction compartment.

43. The automated analytical apparatus of claim 29 wherein said sample transfer means includes means to inject the sample into the reaction compartment of the disposable container.

44. The automated analytical apparatus of claim 43 wherein said sample injection means includes a revolving syringe head, a syringe holder supported by said syringe head, a magazine for the storage of disposable syringes, and indexing means to move said injection means into and out of the reaction compartment.

45. An automated analytical apparatus comprising a magazine for the storage of a plurality of different disposable reaction containers, means to add a material to be analyzed to a reaction compartment within a disposable container, at least one means for the addition of at least one reagent stored within the disposable container to the reaction compartment, means to monitor at least one of the physical properties of the reaction mixture within the disposable container, said monitoring means including light source means and means responsive to the magnitude of light absorbed by the reaction mixture as light is transmitted therethrough from said light source means, said monitoring means further including means to compress said disposable container between said light source means and said responsive means during analysis to define a fixed optical path length through the reaction mixture; and means to transport the disposable container from said magazine through said material addition means and said reagent addition means to said monitoring means.

46. The automated analytical apparatus of claim 45 wherein said magazine is partitioned into a plurality of storage compartments.

47. The automated analytical apparatus of claim 45 wherein said transport means includes means to select a particular disposable container from a storage compartment in said magazine and load the disposable container on said transport means.

48. The automated analytical apparatus of claim 45 further including at least one additional means for the addition of at least one reagent stored within said disposable container to the reaction compartment.

49. An automated analytical apparatus comprising a magazine for the storage of a plurality of different disposable reaction containers, said magazine being partioned into a plurality of storage compartments for the storage of different reaction containers with only like prepackaged reagent-storing containers being stored in any one compartment; means to add a material to be analyzed to a reaction compartment within a disposable container; at least one means for the addition of at least one reagent stored within the disposable container to the reaction compartment; means to incubate the reaction compartment of the disposable container at predetermined ambient conditions for a period of time sufficient to bring the reaction mixture to the desired state for analysis; means to monitor at least one of the physical properties of the reaction mixture within the reaction compartment; said monitoring means including light source means and means responsive to the magnitude of light absorbed by the reaction mixture as light is transmitted therethrough from said light source means, said monitoring means further including means to compress said disposable container between said light source means and said responsive means during analysis to define a fixed optical path length through the reaction mixture; means to transport the disposable container from said magazine through said material addition means, said reagent addition means, and said incubtion means to said monitoring means; and means to eject a disposable container from said storage compartment in said magazine and load the container on said transport means.

50. The automated analytical apparatus of claim 49 wherein said reagent addition means includes at least one probe and probe drive to force prepackaged reagent out of a reagent storage chamber in the disposable container.

51. The automated analytical apparatus of claim 49 wherein said incubation means surrounds at least a portion of said transport means.

52. An automated analytical apparatus adapted for use with reagent-storing disposable reaction containers, each of the containers being carried by a support member and being sectioned into a reaction compartment and a plurality of reagent storage compartments, the compartments being separated from each other by walls weakly bonded to the supporting carrier so that the compartments can be brought into communication upon destruction of the weak bonds; said apparatus comprising means to add a sample to be analyzed to a reaction compartment within a disposable container, at least one means for the addition of at least one reagent stored within the disposable container to the reaction compartment, means to monitor at least one of the physical properties of the reaction mixture within the reaction compartment, said monitoring means including light source means and means responsive to the magnitude of light absorbed by the reaction mixture as light is transmitted therethrough from said light source means, said monitoring means further including means to compress said disposable container between said light source means and said responsive means during analysis to define a fixed optical path length through the reaction mixture, and means to transport the disposable container through said sample addition means and said reagent addition means to said monitoring means.

53. The automated analytical apparatus of claim 52 further including a magazine for the storage of plurality of said disposable containers, said transport means being adapted to transport each of said disposable containers from said magazine through said sample and reagent addition means to said monitoring means.

54. The automated analytical apparatus of claim 52 wherein said reagent addition means includes means to manipulate the weak bonds separating the reagent storage compartments from the reaction compartment.

55. The automated analytical apparatus of claim 54 further including means to reinforce a particular weak bond while another weak bond is being destroyed by said manipulation means.

56. The automated analytical apparatus of claim 52 wherein there is at least one further weak bond partitioning a reagent storage chamber into a plurality of sub-compartments and said reagent addition means includes means to manipulate a partitioning weak bond.

57. The automated analytical apparatus of claim 56 further including means to reinforce a particular weak bond while another weak bond is being destroyed by said manipulation means.

58. The automated analytical apparatus of claim 52 further including means to automatically record the data obtained by said monitoring means on at least one portion of the support member.

59. The automated analytical apparatus of claim 52 further including at least one additional means for the addition of at least one reagent stored within the disposable container to the reaction compartment.

60. The automated analytical apparatus of claim 52 further including means to record data on at least one portion of the support member.

61. The automated analytical apparatus of claim 60 further including means for shearing the reaction container portion of the support member from the portion of the support member having data thereon, and means to receive the data containing portion of the support member.

62. An automated analytical apparatus comprising a magazine for the storage of a plurality of different disposable reaction containers, said magazine being partitioned into a plurality of storage compartments for the storage of different reaction containers with only like prepackaged reagent-storing containers being stored in any one compartment, means to add a sample to be analyzed to a reaction compartment with a disposable container, at least one means for the addition of at least one reagent stored within the disposable container to the reaction compartment, means to incubate the reaction mixture within the reaction compartment at predetermined ambient conditions for a period of time sufficient to bring the reaction mixture to the desired state for analysis, means to monitor at least one of the physical properties of the reaction mixture within the reaction compartment, said monitoring means including light source means and means responsive to the magnitude of light absorbed by the reaction mixture as light is transmitted therethrough from said light source means, said monitoring means further including means to compress said disposable container between said light source means and said responsive means during analysis to define a fixed optical path length through the reaction mixture; a sample magazine for the storage of a plurality of instruction-bearing sample-containing vessels, means to read said instructions on the storage vessels and to eject the appropriate reaction container from said storage compartment in said magazine, means to receive the reaction container from said storage compartment and transport said reaction container to said sample addition station and said reagent addition station, means to eject said reaction container from said sample addition station and said reagent addition station, means to receive the ejected reaction container from said sample addition means and said reagent addition means and transport said reaction container to said incubation means, means to eject said reaction container from said incubation means, means to receive the ejected reaction container from said incubation means and transport said reaction container to said monitoring means, and means to eject said reaction container from said monitoring means after analysis.

63. The automated analytical apparatus of claim 62 wherein said means to receive the reaction container from said sample addition means and said reagent addition means and the means to receive the reaction container from said incubation means are the same means.

64. The automated analytical apparatus of claim 62 wherein each receiver and transport means comprises a traversing reaction container carrier.

65. An automated analytical apparatus comprising a reel for the storage of an elongated tape having a plurality of reagent storage containers supported thereon; means to add a sample to be analyzed to a reaction compartment within the reagent-storing container; means for the addition of at least one reagent stored within the container to the reaction compartment; means to incubate the reaction mixture within the reaction compartment at predetermined ambient conditions for a period of time sufficient to bring the reaction mixture to the desired state for analysis; means to monitor at least one of the physical properties of the reaction mixture within the reaction compartment; said monitoring means including light source means and means responsive to the magnitude of light absorbed by the reaction mixture as light is transmitted therethrough from said light source means, said monitoring means further including means to compress said disposable container between said light source means and said responsive means during analysis to define a fixed optical path length through the reaction mixture; and means to advance the tape through said sample addition means, said reagent addition means and said incubation means to said monitoring means.

66. The automated analytical apparatus of claim 6 wherein there are a plurality of wheels for the storage of elongated tapes, each tape having a plurality of like reagent-storing containers supported thereon, each reagent-storing container representing a prepackaged chemical testing unit to be used in a particular chemical analytical procedure, and means to index said sample addition means so that said sample addition means can be used to add sample to any one of the reagent-storing containers supported by the elongated tapes.

67. Photometric means for monitoring the chemical composition of a reaction mixture held within a reaction compartment of a flexible disposable chemical testing container comprising radiation source means adjacent a first side of the reaction compartment, means adjacent the opposite side of the reaction compartment responsive to the magnitude of light absorbed by the reaction mixture as electromagnetic radiation is transmitted therethrough from said radiation source means, and means to press said radiation source means and said responsive means against opposite sides of the reaction compartment during analysis to define a fixed optical path length through the reaction mixture.

68. Means to dispense a plurality of reagents from their storage sites in a disposable reaction container, each container being sectioned into a reaction compartment and a plurality of reagent storage compartments, the reaction compartment being separated from each storage compartment by a weak bond so that upon destruction of said weak bond the reaction compartment and the storage compartment can be brought into communication, said dispensing means comprising means to manipulate at least one weak bond separating a reagent storage compartment from said reaction compartment to thereby place the reagent compartment in communication with the reaction compartment, and means to reinforce at least one other of said weak bonds while said other weak bond is being destroyed by said manipulation means.

69. The means of claim 68 wherein said manipulation means comprises vacuum means to pull the opposing faces of said weak bond apart.

70. The means of claim 68 wherein said manipulation means comprises means to promote flexing of the opposed faces of said weak bonds.

71. The means of claim 68 wherein said manipulation means comprises means to cause one layer of said weak bond to buckle away from the opposing layer of said weak bond.

72. Means to dispense a plurality of reagents from their container being sectioned into a reaction compartment and storage sites in a disposable reaction container, each a plurality of reagent storage compartments, the reaction compartment being separated from each storage compartment by a weak bond so that upon destruction of said weak bond the reaction compartment and the storage compartment can be brought into communication, said dispensing means comprising means to place at least one reagent compartment in communication with the reaction compartment and means to initially prevent such communication as to at least one other of said reagent compartments by reinforcing said weak bond adjacent thereto while said other weak bond adjacent the reagent compartment being placed in communication with the reaction compartment is being destroyed by said communication promoting means.

73. The means of claim 70 wherein said manipulation means comprises means to cause one layer of said weak bond to buckle away from the opposing layer of said weak bond.

74. Means to dispense a plurality of reagents from their storage sites in a disposable reaction container, each container being sectioned into a reaction compartment and a plurality of reagent storage compartments, the reaction compartment being separated from each storage compartment by a weak bond so that upon destruction of said weak bond the reaction compartment and the storage compartment can be brought into communication, said dispensing means comprising means to place at least one reagent compartment in communication with the reaction compartment and means to intially prevent such communication as to at least one other of said reagent compartments by reinforcing said weak bond adjacent thereto while said other weak bond adjacent the reagent compartment being placed in communication with the reaction compartment is being destroyed by said communication promoting means.

75. The disposable testing unit of claim 77 further including a channel in communication with each reaction compartment for the addition of materials thereto.

76. The disposable testing unit of claim 77 wherein said supporting carrier and said member securely bonded thereto are heat sealed together.

77. A disposable chemical testing unit comprising a supporting carrier and a member securely bonded thereto, said carrier and said member defining a plurality of separate reaction compartments and a plurality of reagent storage chamber associated with each of said reaction compartments, said reaction compartments being separated by barrier means adapted to prevent the transfer of material between adjacent reaction compartments, each of said reagent storage chambers being separated from the reaction compartment adjacent thereto by walls weakly bonded to said supporting carrier so that each of said chambers can be brought into communication with the adjacent reaction compartment upon destruction of the weak bonds, the wall or walls of each of said reaction compartments being sufficiently optically transparent so that each of said reaction compartments can be utilized as a cuvette for optical analysis, and said wall or walls being sufficiently flexible so that external optical path-defining means can cooperate therewith to define a fixed optical path length through the reaction mixture in each of said reaction compartments.

78. An automated analytical system including the disposable testing unit of claim 77 a station for the addition of a sample aliquot to at least one reaction compartment, at least one station for the addition of at least one reagent stored within said disposable testing unit to at least said sample-containing reaction compartment, a detection station for monitoring at least one of the physical properties of each reaction mixture within each reaction compartment, said detection station including light source means and means responsive to the magnitude of light absorbed by each reaction mixture as light is transmitted therethrough from said light source means, said detection station including optical path-defining means adapted to cooperate with the flexible wall or walls of each reaction compartment to define a fixed optical path length through the reaction mixture therein, and means to transport said disposable testing unit through each of said stations to said detection station.

79. The disposable chemical testing unit of claim 77 wherein there are a plurality of separate reagent storage chambers associated with each of said reaction compartments.

80. The disposable testing unit of claim 77 wherein said reaction compartment wall or walls are sufficiently flexible so that they will yield when pressed against by light source means and detection means in a detection station to thereby define a fixed optical path length between said light source means and said detection means through the reaction mixture in each of said compartments.

81. The disposable testing unit of claim 77 wherein said testing unit comprises material or materials which do not adversely affect to an unacceptable degree each analysis being conducted therein.

82. The disposable testing unit of claim 77 wherein said supporting carrier and said member are securely bonded together with strong seals adjacent the outer perimeter of said reaction compartment and said plurality of reagent storage compartments.

83. The disposable testing unit of claim 77 wherein said member comprises a unitary plastic layer having formed therein said plurality of separate reagent storage compartments.

84. A disposable reaction container comprising at least one compartment for the admixing of materials added thereto, the wall or walls of each compartment being sufficiently optically transparent so that each compartment can be utilized as a cuvette for optical analysis, said wall or walls being sufficiently flexible so that external optical path-defining means can cooperate therewith to define a fixed optical path length through the reaction mixture in each compartment, a storage section having at least one separate reagent storage chamber which can be placed in communication with each of said lower compartments, and restraining means to prevent the premature movement of prepackaged reagents from each of said storage chambers, and restraining means comprising a shearable layer positioned between said storage section and said admixing compartment or compartments adjacent the opening of each of said storage chambers, said shearable layer being sufficiently strong so that it will shear only below a particular storage chamber when application of force is made thereto from within said storage chamber.

85. The disposable reaction container of claim 84 wherein said wall or walls are sufficiently flexible so that they will yield when pressed against by light source means and detection means in a detection station to thereby define a fixed optical path length between said light source means and said detection means through the reaction mixture in each compartment.

86. The disposable reaction container of claim 84 wherein said disposable container comprises material or materials which do not adversely affect to an unacceptable degree each analysis being conducted therein.

87. The disposable reaction container of claim 84 wherein said optically transparent portion of each compartment through which optical analysis is made is substantially vertical when said container is in position for optical analysis.

88. The disposable reaction container of claim 84 wherein each of said compartments has side walls and a bottom wall and at least those side walls disposed substantially parallel to the longitudinal axis of said container being substantially vertical and sufficiently optically transparent for optical analysis therethrough.

89. The disposable reaction container of claim 84 wherein there are a plurality of separate reagent storage chambers associated with each of said reaction compartments.

90. The disposable reaction container of claim 84 wherein said restraining means comprises a thin plastic layer or compartments, said storage section, said plastic layer and said admixing compartment section being bonded together.

91. An automated analytical system including the disposable reaction container of claim 84, a station for the addition of a sample aliquot from a sample storage site to at least one of said reaction compartments, at least one station for the addition of at least one reagent stored within said disposable container to at least said sample containing reaction compartment, a detection station for monitoring at least one of the optical properties of each reaction mixture within each reaction compartment and deriving a final analytical result based upon the information obtained therefrom, said detection station including optical path-defining means adapted to cooperate with the flexible wall or walls of each reaction compartment to define a fixed optical path length through the reaction mixture therein, and means to transport said disposable reaction container through each of said stations to said detection station.

92. The automated analytical system of claim 91 wherein said container has a plurality of reaction compartments and the additions to each of said reaction compartments are such that a difference in absorbance results and said detection station includes means for measuring the absorbance of the reaction mixture within each reaction compartment and means to derive a final analytical result based upon the measured absorbance differences.

93. The automated analytical system of claim 91 further including a second station for the addition of at least one further reagent stored within the disposable container to at least one of said reaction compartments.

94. A lower reaction compartment section of a disposable reaction container comprising a unitary member formed into a plurality of reaction compartments having a flange adjacent at least a portion of the upper perimeter thereof, each reaction compartment having at least one side wall and a bottom wall, at least a portion of each reaction compartment being sufficiently optically transparent so that each compartment can be utilized as a cuvette for optical analysis, said side wall or walls being sufficiently flexible so that external optical path-defining means can cooperate therewith to define a fixed optical path length through the reaction mixture in each compartment.

95. The lower reaction compartment section of claim 94 wherein said section has side walls disposed substantially parallel to the longitudinal axis of said lower section, said side walls being substantially vertical and sufficiently optically transparent for optical analysis therethrough.

96. The lower reaction compartment section of claim 94 wherein adjacent reaction compartments are separated by said flange or a portion thereof which acts as a barrier to prevent the admixing of materials added to adjacent reaction compartments.

97. The lower reaction compartment section of claim 94 wherein said flange is wider along one longitudinal portion thereof and adapted for the storage of information thereon.

98. The lower reaction compartment section of claim 94 wherein said flange and said side wall or walls define an opening in said flange through which materials are added to each of said reaction compartments.

99. A lower reaction compartment section of a disposable reaction container comprising a unitary member formed into a plurality of reaction compartments having a flange encircling the upper perimeter thereof, adjacent reaction compartments being separated by a portion of said flange which acts as a barrier to prevent the admixing of materials added to adjacent compartments, each reaction compartment comprising four side walls and a bottom wall, said flange and said four side walls of each reaction compartment defining an opening in said flange through which materials are added to each of said reaction compartments, at least those side walls disposed parallel to the longitudinal axis of said lower section being substantially vertical and sufficiently optically transparent so that optical analysis can be made therethrough, and said side walls being sufficiently flexible so that external optical path-defining means can cooperate therewith to define a fixed optical path length through the reaction mixture in each compartment.

100. The lower reaction compartment section of claim 99 wherein said flange is wider along one longitudinal portion thereof and adapted for the storage of information thereon.

101. An automated analytical apparatus comprising means to carry a plurality of reagent-storing, disposable chemical testing containers; means to transfer a sample aliquot from a sample storage site to a reaction compartment within one of the plurality of disposable containers; means for the addition of at least one reagent stored within the disposable container to the reaction compartment; means further along the path length of travel of said carrying means to monitor at least one of the physical properties of the reaction mixture within the reaction compartment, said monitoring means including means to cooperate with the flexible wall or walls of said reaction compartment to define a fixed optical path through the reaction mixture therein; and means to advance said carrying means through said sample and reagent addition means to said monitoring means.

102. The automated analytical apparatus of claim 101 further including at least one additional means for the addition of at least one further reagent stored within the disposable container to a reaction compartment.

103. The automated analytical apparatus of claim 101 wherein said reagent addition means includes means to place the reagent-storing chambers of the disposable container in communication with the reaction compartment.

104. The automated analytical apparatus of claim 101 wherein each reagent is stored in a storage chamber separated from the reaction compartment by walls weakly bonded to a supporting carrier, and said reagent addition means includes means to manipulate the weak bonds separating the reagent storage chamber from the reaction compartment.

105. The automated analytical apparatus of claim 104 further including means to reenforce a particular weak bond separating one reagent chamber from the reaction compartment while another weak bond separating a different reagent chamber from the reaction compartment is being destroyed by said manipulation means.

106. An automated analytical apparatus adapted for use with reagent-storing, disposable chemical testing containers, each testing container having a plurality of reaction compartments separated from adjacent compartments by barrier means adapted to prevent the transfer of material between adjacent compartments, a plurality of separate reagent storage chambers in communication with each of said compartments, and restraining means to prevent the premature movement of prepackaged reagents from said plurality of storage chambers; said apparatus comprising means to carry a plurality of disposable containers, means to transfer a sample aliquot from a sample storage site to at least one of the reaction compartments within one of the plurality of disposable containers, first means for the addition of at least one reagent stored within the disposable container to at least one of the reaction compartments, second means for the addition of at least one other reagent stored within the disposable container to at least one of the reaction compartments, means further along the path of travel of said carrying means to monitor at least one of the physical properties of the reaction mixture within each reaction compartment, said monitoring means including means to cooperate with the flexible wall or walls of said reaction compartment to define a fixed optical path length through the reaction mixture therein; and means to advance said carrying means through said sample and reagent addition means to said monitoring means.

107. The automated analytical apparatus of claim 106 wherein said additions to each of said reaction compartments are such that a difference in absorbance results; said monitoring means including means for measuring the absorbance of the material within each reaction compartment and means to derive a final analytical result based upon the measured absorbance differences.

108. An automated analytical system including the disposable reaction container of claim 1, a station for the addition of a sample aliquot from a sample storage site to at least one of said reaction compartments, at least one station for the addition of at least one reagent stored within said disposable container to at least said sample-containing reaction compartment, a detection station for monitoring at least one of the optical properties of each reaction mixture within each reaction compartment and deriving a final analytical result based upon the information obtained therefrom, said detection station including optical path-defining means adapted to cooperate with the flexible wall or walls of each reaction compartment to define a fixed optical path length through the reaction mixture therein, and means to transport said disposable reaction container through each of said stations to said detection station.

109. The automated analytical system of claim 108 wherein the additions to each of said reaction compartments are such that a difference in absorbance results and said detection station includes means for measuring the absorbance of the reaction mixture within each reaction compartment and means to derive a final analytical result based upon the measured absorbance differences.

110. The automated analytical system of claim 108 further including a second station for the addition of at least one further reagent stored within the disposable container to at least one of said reaction compartments.

111. The method of analyzing a test sample in a disposable reaction container having a reaction compartment, at least one reagent stored within said disposable container but separated from said reaction compartment, and at least a portion of the reaction compartment of said disposable container being sufficiently optically transparent so that the reaction compartment can be utilized as a cuvette for optical analysis, said method comprising adding a sample aliquot to the reaction compartment, adding at least one reagent stored within the disposable container to said reaction compartment, incubating said reaction mixture within said reaction compartment for a period of time sufficient to bring the reaction mixture to the desired state for analysis, and monitoring at least one of the optical properties of said reaction mixture while it is within said reaction compartment, said monitoring including defining a fixed optical path length through the reaction mixture in the reaction compartment by cooperation of external optical path-defining means with the sufficiently flexible walls of said reaction compartment and passing a beam of electromagnetic radiation through said reaction mixture along said fixed optical path.

112. The method of claim 111 wherein said optical path is defined by pressing light source means and responsive means in a detection station against the reaction compartment.

113. The method of analyzing a test sample in a disposable reaction container having a plurality of separate reaction compartments, at least a portion of each reaction compartment being sufficiently optically transparent so that each reaction compartment can be utilized as a cuvette for optical analysis, and at least one reagent stored within said disposable container adjacent each reaction compartment but separated therefrom; said method comprising adding a sample aliquot to at least one reaction compartment; adding at least one reagent stored within the disposable container to at least the sample-containing reaction compartment; incubating the solutions within said reaction compartments for a period of time sufficient to bring said solutions to the desired state for analysis; said additions to said reaction compartments resulting in said solutions having different optical properties during optical analysis; monitoring at least one of the optical properties of each solution while it is within its respective reaction compartment, said monitoring including defining a fixed optical path length through the solution in the reaction compartment by cooperation of external optical path-defining means with the sufficiently flexible wall or walls of the reaction compartment and passing a beam of electromagnetic radiation through each of said solutions along said fixed optical path length; and deriving a final analytical result based upon the measured optical property differences.

114. The method of claim 113 wherein said optical path is defined for each reaction compartment by pressing light source means and responsive means in a detection station against the reaction compartment.

115. Photometric means for monitoring the chemical composition of a reaction mixture held within a reaction compartment of a flexible disposable chemical testing container comprising radiation source means adjacent a first side of the reaction compartment, means adjacent the opposite side of the reaction compartment responsive to the magnitude of light absorbed by the reaction mixture as electromagnetic radiation is transmitted therethrough from said radiation source means, and said radiation source means and said responsive means adapted to cooperate with the flexible wall or walls of the reaction compartment during analysis to define a fixed optical path length through the reaction mixture therein.

References Cited

UNITED STATES PATENTS

| | | | |
|---|---|---|---|
| 2,487,236 | 11/1949 | Greenberg | 206—47 |
| 3,028,000 | 4/1962 | Clements et al. | |
| 3,064,802 | 11/1962 | Jess et al. | 206—47 |
| 3,344,914 | 10/1967 | Bloom et al. | 206—47 |
| 3,476,515 | 11/1969 | Johnson et al. | 23—253 X |

FOREIGN PATENTS 239,202  7/1962  Australia.

MORRIS O. WOLK, Primary Examiner

R. E. SERWIN, Assistant Examiner

U.S. Cl. X.R.

23—253, 259, 292; 206—47; 220—23, 23.8

UNITED STATES PATENT OFFICE
CERTIFICATE OF CORRECTION

Patent No. 3,497,320      Dated April 6, 1970

Inventor(s) W. E. Blackburn et al

It is certified that error appears in the above-identified patent and that said Letters Patent are hereby corrected as shown below:

Claim 22, line 3, after "compartments" insert --,--.

Claim 29, line 18, after "path" insert --length--.

Claim 49, line 3, cancel "partioned" and substitute therefor --partitioned--.

Claim 49, line 26, cancel "incubtion" and substitute therefor --incubation--.

Claim 53, line 2, after "of" insert --a--.

Claim 66, line 1, cancel "6" and substitute therefor --65--.

Claim 78, line 2, after "77" insert --,--.

Claim 90, line 3, cancel "or compartments".

Claim 101, line 8, cancel "length".

Delete all of claim 72 and substitute therefor -- The photometric monitoring means of claim 67 wherein only one of said radiation source means and said responsive means is moved in defining said optical path--.

Delete all of claim 73 and substitute therefor -- The photometric monitoring means of claim 67 wherein both of said radiation source means and said responsive means are moved to define said optical path.--.

Signed and sealed this 12th day of January 1971

(SEAL)
Attest:

EDWARD M. FLETCHER, JR.
Attesting Officer

WILLIAM E. SCHUYLER, JR.
Commissioner of Patents

Notice of Adverse Decision in Interference

In Interference No. 97,827, involving Patent No. 3,497,320, W. E. Blackburn, D. A. Hamilton, L. A. Inners and G. C. Reid, AUTOMATED CHEMICAL ANALYZER, final judgment adverse to the patentees was rendered Sept. 23, 1976, as to claims 67 and 115.

[*Official Gazette March 22, 1977.*]